Oct. 6, 1970 J. R. MILES 3,532,424
ELLIPTICAL REFLECTOR FOR PHOTOCOPYING MACHINE
Filed Nov. 16, 1967

Inventor:
John R. Miles
By Sol L. Goldstein
John J. Connors
Attys.

United States Patent Office 3,532,424
Patented Oct. 6, 1970

3,532,424
ELLIPTICAL REFLECTOR FOR PHOTOCOPYING
MACHINE
John R. Miles, Glenview, Ill., assignor to Addressograph-Multigraph Corporation, Mount Prospect, Ill., a corporation of Delaware
Filed Nov. 16, 1967, Ser. No. 683,626
Int. Cl. G03b 27/54, 27/70
U.S. Cl. 355—30                                              6 Claims

ABSTRACT OF THE DISCLOSURE

This invention concerns a device 10 used in a photocopying machine to illuminate a graphic original. This device 10 includes a tubular light source 36, and a concave, elongated elliptical reflector 34 adjacent the source. The unique feature of the device is that the reflector 34 has a longitudinal opening 40 therein through which light reflected by the original is transmitted to an optical assembly 22. The reflector 34 focuses light on the original as a narrow band of illumination which lies transverse the direction of movement of the original. The original absorbs light in information areas and reflects light in noninformation areas. And the reflected light passes through the opening 40 to the optical assembly 22 which projects it onto a copy sheet.

BACKGROUND OF INVENTION

Photocopying machines of the scanning type are available which make copies of either a thin sheet original or a three-dimensional item such as a book. Some of these machines can make either 1:1 reproductions of the original or enlarged or reduced copies thereof. In these machines feeder mechanisms move the original and a light sensitive copy sheet along separate paths, respectively, past an illuminating station and an exposing station. When a 1:1 reproduction is made, the copy sheet and original are moved past their respective stations at the same time and at the same speed. If a reduced or enlarged copy is made, the original and copy sheet are moved at different speeds in proportion to the reduction or enlargement. During the movement of the original past the illuminating station, a light equipped with an elliptical reflector focuses light on the original in the form of a band of illumination lying transverse the direction of movement of the original. The light is absorbed in information areas of the original and reflected in noninformation areas, and a lens intermediate the station projects the reflected light onto the copy sheet, exposing it.

These machines, though capable of producing quality copies, sometimes make blurred copies, reproduce shadows of three-dimensional book originals, and, if precautions are not taken, char the original being copied.

Blurring results when the feeder mechanisms move the original and copy sheet past their respective stations at disproportionate speeds. Although this disproportionate movement of the copy sheet and original is never very great, portions of the copy sheet are blurred because of it. The degree of blurring depends on the width of the band of illumination and the degree of disproportionate movement. The wider the band of illumination the more extensive the blur will be because the distorted light image of the original affects a larger area of the copy sheet. Conversely, the narrower the band, the smaller the blur.

One apparently simple solution to the problem is to design a sheet feed mechanism which always moves the original and copy sheet at proportionate speeds. This, however, cannot be done in an economic or efficient manner. Another solution is to design an optical system which is insensitive to this disproportionate movement. However, conventional optical systems using elongated elliptical reflectors to focus a band of illumination on the original fail to eliminate blurring because they cannot bring enough light into sharp focus at the illuminating station. Since the light source has finite dimensions and the reflector is never perfectly elliptical, a precise and sharp focus is never achieved.

Reproducing shadows of a three-dimensional item such as a book is the result of projecting light at the item from only one direction. This creates a shadow of the item which shows up on the copy as an information area. Such a shadow interferes with the production of an accurate copy of the item.

Charring of the original occurs if an excess of infrared radiation is concentrated on the original. Care must be taken to insure that the temperature of the original is maintained below its char point, otherwise it will be damaged.

SUMMARY OF INVENTION

The primary object of this invention is to provide an improved photocopying apparatus of the scanning type which quickly and efficiently makes a copy of an original and reduces or altogether eliminates a blurred copy.

Another object of this invention is to use an elliptical reflector to concentrate the maximum amount of light emanating from the source on the smallest possible area of an original while simultaneously transmitting light reflected by the original to an optical assembly.

Yet another object of this invention is to illuminate a three-dimensional item in such a manner so that a shadow of the item is not formed.

A specific object of this invention is to employ a reflector designed to prevent charring of an original.

In accordance with this invention there is provided an improved photocopying machine comprising an exposing station where a copy sheet is exposed, an illuminating station including an elongated light source where an original is illuminated, and an optical assembly between the stations for projecting a light image of the original onto the copy sheet. A novel, elongated, elliptical reflector adjacent the light source and intermediate the optical assembly and illuminating station focuses light on the original, whereby light is absorbed in information areas of the original and reflected by noninformation areas of the original. The reflector is characterized by having an opening therein through which light reflected by the original is transmitted to the optical assembly.

It has been found that the band of illumination focused on the original should be no greater than about one-half inch wide. In fact, the narrower the band of illumination, the less sensitive the optical system is to disproportionate movement between the copy sheet and original. By using such a narrow band of light, a 1:1 image of the original having a resolution of about 3.5 lines per millimeter is maintained even though the speed between the copy sheet and original differs by as much as 1.1%. Conventional designs wherein the illumination band width exceeds one-half inch can only tolerate a differential in speed of about 0.7%. This seemingly slight difference accounts in the former case for the sharp, clear copies provided by this invention, and in the later case for the blurred, unreadable copies provided by the prior art.

To bring light into sharp focus on the original, the light source is located at one focal point of the elliptical reflector, and the original is located at the other focal point of the reflector. The diameter of the light source must be small compared to the distance between the source and the reflector. The smaller the diameter relative the distance between the source and the reflector, the sharper the focus. This type of reflector-light source design calls for using a relatively large reflector. Such a reflector collects more of the light emanating from the source to more efficiently utilize the energy provided by the source. This larger reflector, however, must have an opening therein to permit light to pass to the lens which projects the image of the original onto the copy sheet. The prior art suggests using a pair of light sources spaced apart so that they are straddling the optical path along which the image of the original is transmitted. Such illuminating systems, requiring the use of two light sources, are not as efficient or economical as the illuminating device of this invention.

To insure that the illuminating station and source are maintained at a temperature level below the char point of the original, the reflector is of the type which transmits infrared radiation and reflects visible radiation. The reflector also has several small air ports therein through which air is circulated to cool the source.

It is also desirable to eliminate any shadow of the original at the illuminating station. This is achieved by directing light at the original from different directions.

DESCRIPTION OF PREFERRED EMBODIMENT

Figure 1:
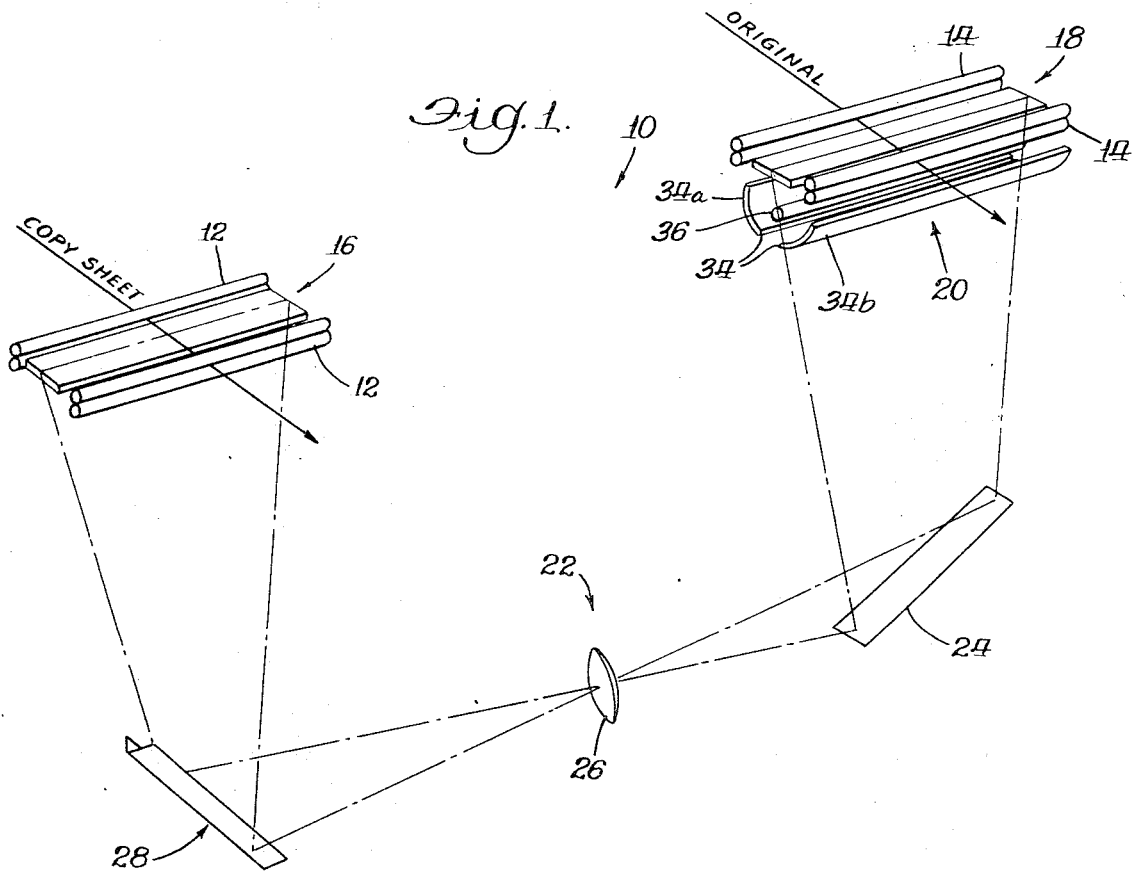
FIG. 1 is a schematic illustration of an optical subassembly of a photocopying machine.

Referring to FIG. 1 there is illustrated an optical assembly 10 which is employed in photocopying machines. Feed rollers 12 and 14 advance a copy sheet and original, respectively, past an exposing station 16 and an illuminating station 18. It will be appreciated that a carriage such as disclosed in U.S. Ser. No. 540,975 can be substituted in place of the feed rollers 14 for moving a book original past the illuminating station 18.

As the original and copy sheet are advanced, the novel illuminating device 20 of this invention directs radiant energy onto the surface of the original and a projector assembly 22, including a flat mirror 24, a lens 26, and a roof mirror 28, projects light reflected by the noninformation areas of the original onto the copy sheet. The light is first reflected off the flat mirror 24, collected by the lens 26, reflected off one surface of the roof mirror 28 onto the other surface, and then cast upon the copy sheet. Such a construction is preferred so that a right reading copy of the original is provided. However, other arrangements of reflecting surfaces and lenses may be employed since the invention is independent of the particular arrangement of these elements.

Figure 2:
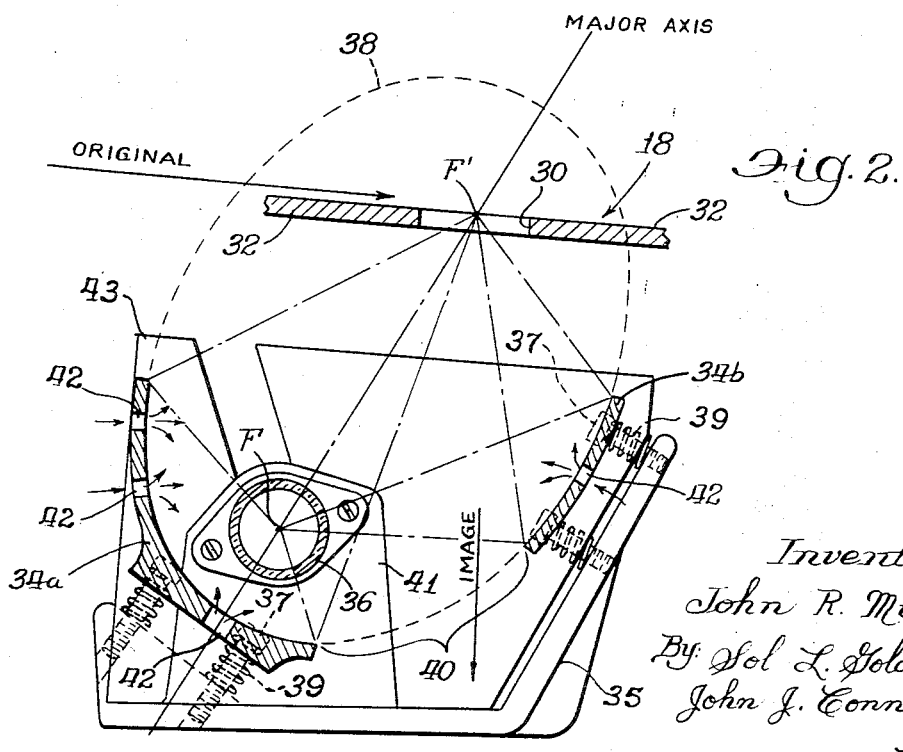
FIG. 2 is a cross sectional view of the illuminating device of this invention.

The illuminating station 18, as best seen in FIG. 2, consists of an opaque plate 32 having a narrow transparent slit 30 therein, and is circumscribed by an ellipse 38. The exposing station 16, though not shown in detail, also consists of an opaque plate having a slit therein as wide as slit 30. The illuminating station 18 lies along a line that is normal to the plane of the ellipse 38 and intersects the ellipse at one of its focal points F'. An elongated light source 36 is at the other focal point F of the ellipse 38, and the longitudinal axis of the light source coincides with the line lying along the focal point F and is parallel to the plane of the illuminating station 18. An elliptical reflector 34 formed into two parts, 34a and 34b, coincides with a portion of the ellipse 38; an aperture 40 is thus formed intermediate the segments 34a and 34b. The reflector portions 34a and 34b are adjustably mounted to a bracket member 35 by threaded fasteners 37 equipped with coiled spring 39 which urge the reflectors against the fastener leads 37 maintaining the reflective surface in an adjusted position. At each end of the bracket 35 there is provided an upright member 41 for receiving the lamp socket mounting (not shown). The reflector assembly is enclosed at the lateral ends with reflective shields 43 to contain the light that might be reflected out the sides.

The reflector 34 is elongated and the aperture or opening 40 lies along a line which is parallel to the longitudinal axis of the light source 36. The distance between the focal point F and the reflector segment 34a taken along the major axis of the ellipse 38 and the diameter of the light source 36 control the width of the band of illumination formed at station 18. If the ratio of the diameter to the distance is less than 0.06, a band of illumination not greater than about one-half inch wide is formed at the illuminating station 18.

Because of this novel construction, if the original and copy sheet are moved at disproportionate speeds past their respective stations 16 and 18 a blurred copy is avoided. As previously mentioned, for a 1:1 reproduction, a differential in speed of 1.1% between the original and copy sheet can be tolerated while maintaining an image resolution of 3.5 lines per millimeter.

In accordance with another feature of this invention the reflector 34 has a multilayer coating thereon of, for example, zinc sulfide and magnesium fluoride. This coating permits the reflector 34 to reflect visible radiation and transmit infrared radiation. A detail description of the construction and operation of these types of reflectors is presented in the May 1960 Journal of Society of Motion Picture and Television Engineers, volume 69. Cold mirrors of this type can be obtained from Liberty Mirror Company of Brackenridge, Pa. Since infrared radiation is dissipated, the temperature of the illuminating station 18 is maintained at low level and charring of the original is prevented. As further means of keeping the station 18 cool, the segments 34a and 34b have air ports 42 therein through which air is circulated. This cools the light source 36.

Although not shown in the drawings, the light source 36 can be provided with an infrared filter as disclosed in U.S. Pat. No. 3,398,259 and assigned to the same assignee. This filter placed between the light source 36 and the illuminating station 18 prevents infrared radiation from being directly cast upon the original. This will also aid in keeping the station 18 cool and further reduce the likelihood of charring the original.

It should be noted that the novel two-piece construction of the reflector 34 also results in illuminating the original from two different directions. Thus, a shadow of a book original is not formed at the illuminating station 18.

From the foregoing description, it is apparent that a simple and efficient illuminating device 20 is provided. By concentrating the light emanating from the light source 36 in the form of a narrow band of illumination, the problems of blurring are substantially reduced. By using a cold mirror 34 having air circulating means 40 therein the temperature of the illuminating station 18 is kept below the char point of the original. And, by employing a two-piece elliptical reflector 34 which illuminates a three-dimensional original from different directions a shadow of the original is not formed at the illuminating station 18.

Although the present invention has been described with reference to a single illustrative embodiment thereof, it will be appreciated that numerous other modifications and embodiments can be devised by those skilled in the art which fall within the spirit and scope of this invention as defined by the appended claims.

What is claimed as novel and desired to be secured by Letters Patent of the United States of America is:

1. A device for illuminating an item comprising an illuminating station circumscribed by an ellipse having a major axis of a predetermined length and lying along a first line that is normal to the plane of the ellipse and intersects the first focal point of the ellipse, a single, elongated elliptical reflector including first and second independent reflector portions; first adjustable bracket means for mounting said first reflector portion so that a cross-sectional segment thereof extends substantially along a first portion of said ellipse curving about the second focal point of the ellipse and intersects the major axis thereof, and second adjustable bracket means for mounting said second reflector portion so that a cross-sectional segment thereof extends substantially along a second portion of said ellipse, said first and second reflector portions thereby being predeterminedly separated with respect to each other to form a longitudinal opening therebetween lying along a second line that parallels said first line, said first and second adjustable bracket means ensuring the accurate positioning of said reflector portions with respect to said ellipse; and an elongated tubular light source intermediate said illumination station and reflector having its longitudinal axis lying along a third line that is normal to the plane of the ellipse and intersects said plane at the second focal point of the ellipse, said reflector focusing light on said item at said station as a narrow transverse band of illumination less than one-half inch in width and transmitting through said opening light reflected by said item.

2. A device as defined in claim 1 wherein said reflector reflects visible radiation and transmits infrared radiation, whereby said station is maintained at a low temperature level.

3. The device as defined in claim 1 wherein said reflector has several small air ports therein through which air is circulated to cool said source.

4. The device as defined in claim 1 wherein the ratio between the diameter of the light source and the distance between the second focal point and the reflector taken along the major axis of the ellipse is less than 0.06.

5. In a photocopying apparatus using an original and light sensitive copy sheets which are transported substantially in synchronism past respective illuminating and exposing stations for projecting a light image of the original onto the copy sheet, the combination comprising: an exposure station where the copy sheet is exposed; an illuminating station where the original is illuminated, said station being circumscribed by an ellipse having a major axis of a predetermined length and lying along a first line that is normal to the plane of the ellipse and intersects the first focal point of the ellipse; means for moving the original and copy sheet respectively past said illuminating and exposing stations at the same time; a single, elongated elliptical reflector including first and second independent reflector portions; first adjustable bracket means for mounting said first reflector portion so that a cross-sectional segment thereof extends substantially along a first portion of said ellipse curving about the second focal point of the elipse and intersects the major axis thereof and second adjustable bracket means for mounting said second reflector portion so that a cross-sectional segment thereof extends substantially along a second portion of said ellipse, said first and second reflector portions thereby being predeterminedly separated with respect to each other to form a longitudinal opening therebetween lying along a second line parallel to said first line; said first and second adjustable bracket means ensuring the accurate positioning of said reflector portions with respect to said ellipse; and an elongated light source disposed intermediate said illuminating station and reflector, having its longitudinal axis lying along a third line normal to the plane of the ellipse and intersecting said plane at the second focal point of the ellipse, said reflector focusing a substantial amount of light emanating from said source as a narrow transverse band of illumination less than one-half inch in width on the original moving past said illuminating station and transmitting through said opening light reflected by said original, for projecting the light reflected by the original onto the copy sheet moving past the exposing station.

6. The apparatus as defined in claim 5 wherein said reflector transmits infrared radiation and reflects visible radiation and has a plurality of air ports therein through which air is circulated to cool said source.

References Cited

UNITED STATES PATENTS

| 3,255,342 | 6/1966 | Seitz et al. | 240—47 |
| 3,302,519 | 2/1967 | Young | 355—30 |

JOHN M. HORAN, Primary Examiner

R. A. WINTERCORN, Assistant Examiner

U.S. Cl. X.R.

240—47; 355—51, 70